United States Patent [19]
Fox et al.

[11] Patent Number: 5,488,662
[45] Date of Patent: Jan. 30, 1996

[54] SYSTEM AND METHOD FOR IDENTIFYING AN ARRIVAL TIME OF A COMMUNICATED SIGNAL

[75] Inventors: Thomas M. Fox, Gilbert; Neal R. Anderson, Mesa; Julius A. Heeren, Phoenix, all of Ariz.

[73] Assignee: Motorola, Inc., Schaumburg, Ill.

[21] Appl. No.: 209,657

[22] Filed: Mar. 10, 1994

[51] Int. Cl.$^6$ ................................................. H04K 1/10
[52] U.S. Cl. ........................... 380/34; 342/189; 342/132; 367/125; 375/208; 375/209
[58] Field of Search ..................................... 342/189, 132, 342/145, 378; 367/125; 375/208, 209; 380/34

[56] References Cited

U.S. PATENT DOCUMENTS

| | | | |
|---|---|---|---|
| 3,150,372 | 9/1964 | Groth, Jr. | 343/112 |
| 3,307,192 | 2/1967 | Atwood | 343/112 |
| 4,975,707 | 12/1990 | Smith | 342/357 |
| 5,051,741 | 9/1991 | Wesby | 340/825.49 |
| 5,151,921 | 9/1992 | Hashimoto | 375/208 |
| 5,179,573 | 1/1993 | Paradise | 375/208 |
| 5,184,135 | 2/1993 | Paradise | 375/209 |
| 5,267,271 | 11/1993 | Rice | 375/1 X |
| 5,323,419 | 6/1994 | Mori et al. | 375/208 |

OTHER PUBLICATIONS

An article entitled "Accuracy Limitations of Hyperbolic Multilateration Systems" by H. B. Lee, IEEE Transactions Aerospace and Electronic Systems, vol. AES–11, No. 1, Jan. 1975, pp. 16–29.

An article entitled "A Novel Procedure for Assessing the Accuracy of Hyperbolic Multilateration Systems": by H. B. Lee, IEEE Transactions Aerospace and Electronic Systems, vol. AES–11, No. 1, Jan. 1975, pp. 2–15.

An article entitled "Implementation of GEOSTAR® RDSS Spread Spectrum Receiver" by M. Motamedi et al., IEEE/IEICE Global Telecommunications Conference 1987, Nov. 15–18, 1987, pp. 1675–1678.

An article entitled "Statistical Theory of Passive Location Systems" by D. J. Torrieri, IEEE Transactions on Aerospace and Electronic Systems, vol. AES–20, No. 2, Mar. 1984, pp. 183–198.

Primary Examiner—David C. Cain
Attorney, Agent, or Firm—Jeffrey D. Nehr

[57] ABSTRACT

A transmitter (12) broadcasts a PN encoded message (16). A receiver (14) includes a SAW correlator (38) configured to autocorrelate with the PN sequence used in the broadcast signal. A preamble of the message (16) conveys two successive bits (18) that are each encoded with the PN sequence. After the correlator (38) has been preloaded with the PN sequence from the first bit (18), its non-correlation output exhibits reduced amplitude time sidelobes. A timing comparison circuit (60) compares a correlation signal (46) with a timing threshold (72). The timing threshold (72) is established at a very low level to minimize the influence of multipath. False triggering on noise is prevented by disabling the timing comparison circuit (60) until after the first bit (18). At this point in time the correlator (38) has been preloaded with its PN sequence, is again being loaded with its PN sequence, and outputs reduced amplitude time sidelobes.

19 Claims, 3 Drawing Sheets

SYSTEM AND METHOD FOR IDENTIFYING AN ARRIVAL TIME OF A COMMUNICATED SIGNAL

TECHNICAL FIELD OF THE INVENTION

The present invention relates generally to an electronic system that identifies when communicated signals arrive at a receiving apparatus. In addition, the present invention relates to systems which convey communicated signals that are encoded with pseudorandom noise (PN) sequences.

BACKGROUND OF THE INVENTION

A variety of electronic systems need to identify a precise point in time when a signal arrives at a receiver. Such systems include multilateration location determination systems, time domain reflectometry systems, and the like. When such systems calculate distances from the receiver based upon the times of arrival for electronic signals traveling at or near the speed of light, an error of as little as a few nanoseconds in identifying the precise arrival time can lead to a distance error of over a meter.

A common problem faced by these and other systems is that of distinguishing a legitimate signal from noise while simultaneously distinguishing a legitimate signal from multipath and other corrupting signals. Conventionally, the receiver generates a detection signal that is compared against a threshold. A time of arrival is indicated when the detection signal exceeds the threshold. However, the threshold must conventionally be established at a level well above a noise floor to prevent the system from falsely indicating time of arrivals in response to noise.

Unfortunately, as the threshold increases, the indicated time of arrivals become prone to errors resulting from multipath and other factors. Multipathing results when the signals reach the receiver by an indirect or reflected path, and often by two or more paths. Direct path and multipath signals reach a receiver at different times, but these different signals may coincide to some extent. In other words, a leading edge of a multipath signal may arrive soon after a leading edge of a direct path signal, and then both are present simultaneously.

Direct path and multipath signals may add to one another or subtract from one another in the receiver so that time of arrivals determined through correspondence with the threshold are inconsistent from situation to situation. If direct path and multipath signals do not interfere or add together in the receiver, then a leading edge slope of a detection signal may increase so that the detection signal actually crosses the threshold correctly. If direct path and multipath signal subtract from one another in the receiver, the detection signal may fail to reach the threshold or reach the threshold too slow.

The use of spread spectrum communication signals helps the multipath problem to some degree. Spread spectrum signals are encoded with a pseudorandom noise (PN) spreading sequence, or code. A correlator in a receiver generates a distinctive, high amplitude detection signal during a period in time while the communication signal correlates with the PN sequence. Multipath signals which arrive at the receiver after this period in time have little or no influence. However, this period may last for many tens of nanoseconds, and multipath signals arriving during this period can still corrupt the detection signal.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
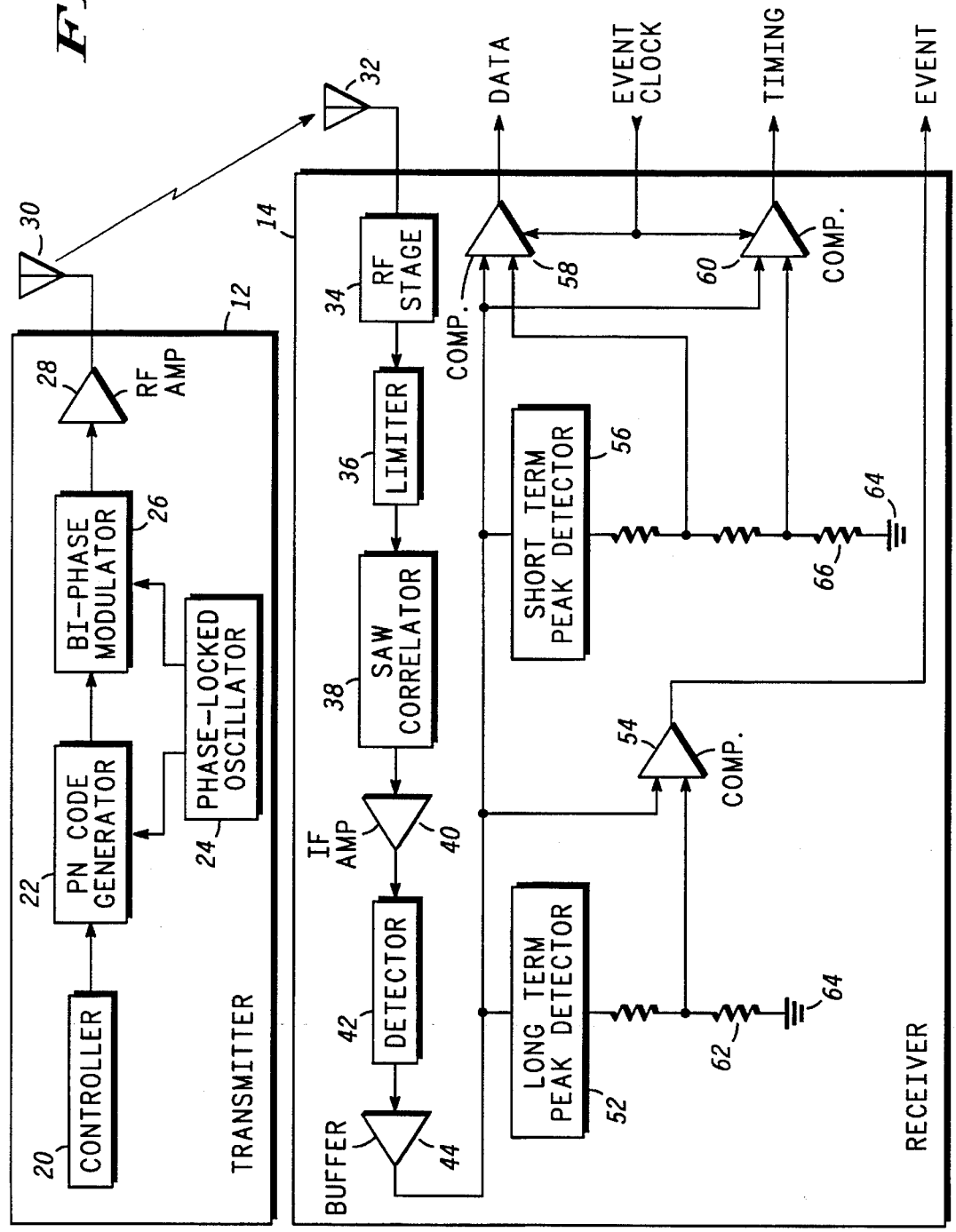
FIG. 1 shows a block diagram of a first portion of a system configured in accordance with the teaching of the present invention.

FIG. 1 shows a block diagram of a first portion of a system 10 configured in accordance with the teaching of the present invention. System 10 identifies the arrival time of a signal that has been communicated from a transmitter 12 and is being received at a receiver 14. In the preferred embodiment, system 10 is used by a multilateration location system in which the location of transmitter 12 is determined relative to known-positions of several of receivers 14, each of which is configured like the others. However, system 10 is not limited to being used only in a location determination system. System 10 may be used in connection with a variety of electronic systems where the arrival time of a communicated signal at a receiver is identified to a high degree of precision.

Figure 2:
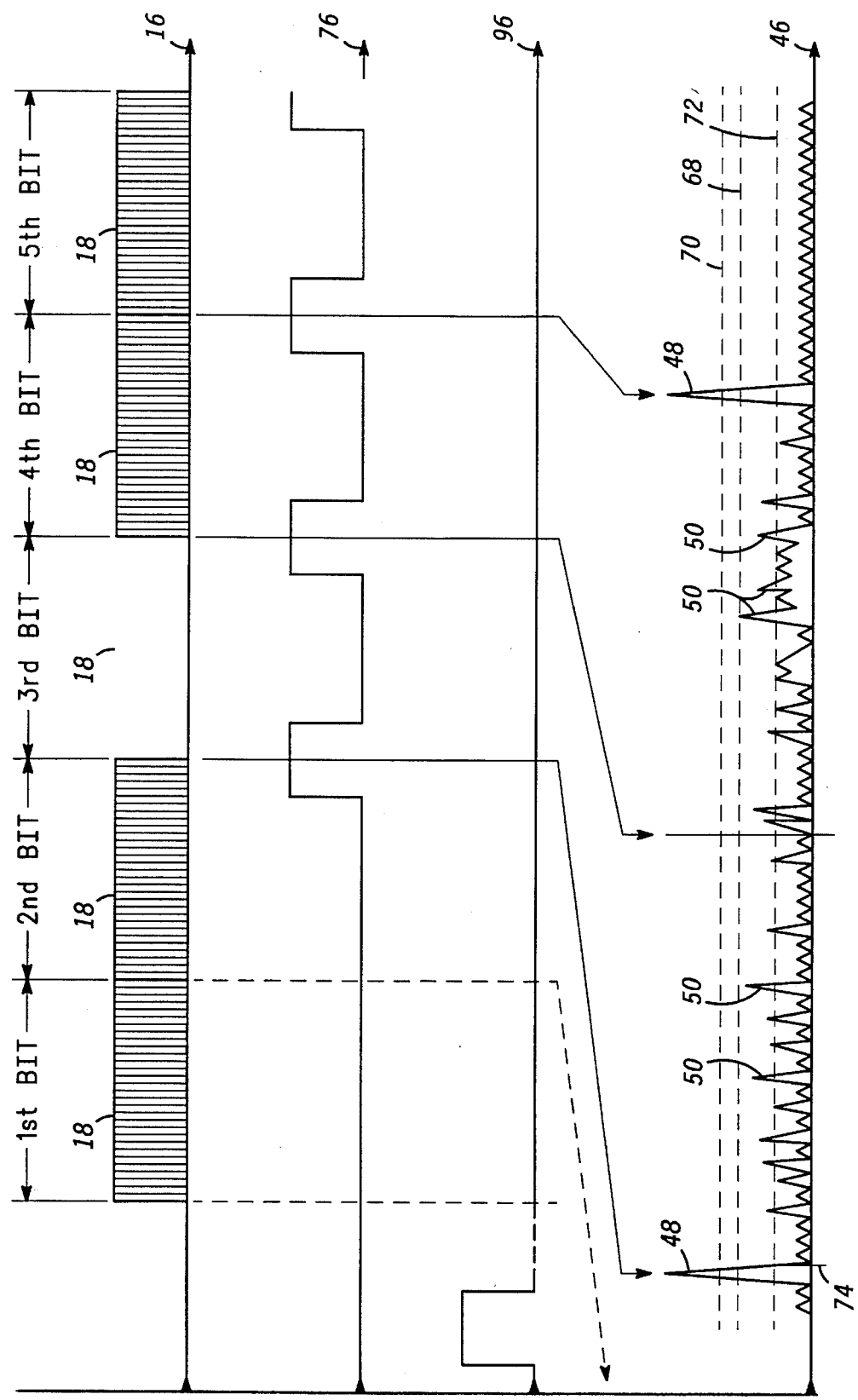
FIG. 2 shows a timing diagram that depicts some of the signals generated by components of the system.

Transmitter 12 is configured to generate and broadcast a spread spectrum signal. This communicated signal conveys a digital message 16, as illustrated in the timing diagram shown in FIG. 2. As shown in FIG. 2, message 16 may include any number of bits 18 of data. FIG. 2 illustrates a portion of the data stream containing the first through fifth bits 18. In the preferred embodiment, the duration of message 16 and the duration of bits 18 within message 16 are relatively constant from message to message. The precise value of these durations is not important to the present invention.

Referring to FIGS. 1 and 2, a controller 20 generates message 16. Controller 20 may include a microprocessor, memory, and related components conventionally found in transmitters. The precise makeup of message 16 is, for the most part, not a critical feature of the present invention. However, controller 20 configures message 16 so that at least two consecutive bits 18 at a consistent location in message 16 exhibit the same state, which is preferably a logical one. This is accomplished by configuring message 16 to include a preamble having logical values of 1-1-0 for the first bit, second bit, and third bit of FIG. 2 bits 18.

Controller 20 serially feeds message 16 to a PN code generator 22. A phase-locked oscillator 24 couples to both PN code generator 22 and a bi-phase modulator 26. An output of modulator 26 couples to an RF amplifier 28, and amplifier 28 drives an antenna 30. In the preferred embodiment, generator 22 encodes message 16 with a predetermined maximal length, 127 bit PN sequence.

More particularly, generator 22 produces the PN sequence only during the bits 18 of message 16 that exhibit one state, which is a logical one in the preferred embodiment. As shown in FIG. 2, the first and second bits of bits 18 convey the PN sequence. During bits 18 that exhibit the other state, a logical zero in the preferred embodiment, PN code generator 22 produces no code, as shown in the third bit of bits 18 in FIG. 2. Accordingly, for each logical one bit 18 conveyed by message 16, a communicated signal broadcast from antenna 30 is bi-phase modulated to convey the PN sequence. For each logical zero bit 18 conveyed by message 16, the communicated signal broadcast from antenna 30 conveys nothing, or silence.

Receiver 14 is configured for compatibility with the communicated signal broadcast by transmitter 12. While FIG. 1 illustrates only one receiver 14, system 10 may include any number of receivers 14, and more than one of these receivers 14 may receive the communicated signal. The communicated signal will arrive at the receivers 14 at different times depending upon the relative distances between the receivers 14 and the transmitter 12. By identifying the times at which the communicated signal arrives at the different receivers 14, a multilateration location process may resolve a position for transmitter 12. The precision of the resolved position will be depend upon the precision with which the receivers 14 identify the times at which the communicated signal arrives. While the following discussion is directed toward a single receiver 14, those skilled in the art will appreciate that it may apply to multiple receivers 14 as well.

Receiver 14 includes an antenna 32, which couples to an RF stage 34. The communicated signal is received at antenna 32 and converted to an IF signal through RF stage 34. RF stage 34 couples to a limiter 36, which removes a large portion of amplitude variation from the bi-phase communicated signal, leaving the signal's frequency content. Limiter 36 couples to a surface acoustic wave (SAW) correlator 38.

Correlator 38 is formed so that the predetermined PN sequence discussed above in connection with PN code generator 22 is preprogrammed therein. Accordingly, correlator 38 is used to perform a correlation function upon the communicated signal. When correlator 38 is loaded with a communicated signal conveying the PN sequence, correlation results. During the correlation, correlator 38 generates a large amplitude output. However, under other circumstances correlator 38 generates a smaller amplitude output. Correlator 38 couples to an IF amplifier 40, which amplifies the output signal from correlator 38. An output of IF amplifier 40 couples to a detector 42, which performs an absolute value and filtering operation on the signal. An output of detector 42 couples to a buffer amplifier 44, which provides amplification and impedance matching for subsequent operations. The output of buffer 44 generates a correlation signal 46, an example of which is shown in the bottom trace of FIG. 2.

The preferred embodiment of the present invention exploits the nature of PN sequences and SAW correlator 38 to control the behavior of correlation signal 46. So long as correlator 38 is entirely loaded with its PN sequence, even though it is not correlating, it generates less noise than it generates when loaded with random noise or other signals. In theory, for a maximal length 127 bit code the time sidelobes generated by correlator 38 should be around 42 dB below a peak amplitude achieved during correlation. However, in practice this value does not achieve the 42 dB attenuation due to manufacturing imperfections. Nevertheless, the time sidelobe output produced by correlator 38 when a currently received bit 18 and an immediately previous bit 18 convey the PN sequence are less than the output produced by correlator 38 when it is not preloaded with the PN sequence from the immediately previous bit 18.

FIG. 2 graphically illustrates this phenomenon. Spikes or peaks 48 of correlation signal 46 occur when correlator 38 is completely loaded and correlates with its PN sequence. Prior to the end of the third bit of bits 18, correlator 38 was loaded with random noise. During this prior period, correlation signal 46 exhibited a generally high level, as illustrated during interval 50. This generally high noise level decreases as more of the PN sequence loads into correlator 38. After correlation for the fourth bit 18, the fourth bit's PN sequence exits correlator 38 as the fifth bit's PN sequence loads. Thus, during the fifth bit, which occurs after spike 48 for the fourth bit, the noise level of correlation signal 46 is relatively low because correlator 38 has been preloaded with its PN sequence. This is shown in FIG. 2 as the low amplitude of correlation signal 46 after spike 48 at the end of the fourth bit.

Referring back to FIG. 1, buffer 44 couples to inputs of a long term peak detector 52, an event comparison circuit 54, a short term peak detector 56, a data comparison circuit 58, and a timing comparison circuit 60. An output of long term peak detector 52 couples through a resistor divider chain 62 to a ground node 64. An intermediate node of resistor divider chain 62 couples to an input of event comparison circuit 54. Likewise, an output of short term peak detector 56 couples through a resistor divider chain 66 to ground node 64. A first intermediate node of resistor divider chain 66 couples to an input of data comparison circuit 58, and a second intermediate node of resistor divider chain 66 couples to an input of timing comparison circuit 60.

Long term peak detector 52 is configured to sample the peak level of correlation signal 46 (see FIG. 2) and to hold this peak level for a long term, which is on the order of 2–5 seconds in the preferred embodiment. Resistor divider chain 62 is configured so that the intermediate output establishes an event threshold 68 which is around ½ of this peak value. FIG. 2 depicts event threshold 68 as a dotted line shown in relation to correlation signal 46. Consequently, event comparison circuit 54 finds correspondence with event threshold 68 whenever the instantaneous value of correlation signal 46 exceeds about ½ of the peak signal level achieved by correlation signal 46 over a previous predetermined duration of more than a couple of seconds.

By finding correspondence with a threshold, such as event threshold 68 or other thresholds discussed below, those skilled in the art will understand that such correspondence may result from either exceeding the threshold or falling below the threshold. For example, in alternate embodiments of the present invention, polarities may be reversed so that comparison circuits find correspondence when a signal falls below a threshold.

Event comparison circuit 54 detects the occurrence of the first one of bits 18 from message 16. Subsequent logical one bits are also detected, but this is of little consequence in the preferred embodiment of the present invention. Long term peak detector 52 provides a mechanism so that this detection self-compensates for false alarms.

As discussed below, the detection of the first bit 18 of message 16 starts a chain of events that continues for longer than the duration of message 16. If event threshold 68 is set too low, event comparison circuit 54 may trigger on noise, and the chain of events will then commence and possibly prevent legitimate messages 16 from being recognized. If event threshold 68 is set too high, event comparison circuit 54 may fail to trigger on weaker correlation signals 46. Thus, if receiver 14 fails to detect events for a long term period, event threshold 68 begins to droop so that weaker and weaker correlation signals 46 will be recognized as events. The chances of falsely triggering on noise increase, but since receiver 14 is not detecting many events the chances of a false trigger preventing legitimate messages 16 from being recognized are low in this situation. On the other hand, if receiver 14 is detecting many events, then event threshold 68 remains high so that the likelihood of falsely triggering on noise is reduced and the chances of legitimate messages 16 not being recognized are likewise low.

Short term peak detector 56 is configured to quickly sample the peak level of correlation signal 46 (see FIG. 2) and to hold this peak level for only a short term, which is slightly longer than the duration of message 16 in the preferred embodiment. Resistor divider chain 66 establishes a data threshold 70, which is shown in FIG. 2, at the first intermediate output and a timing threshold 72, which is also shown in FIG. 2, at the second intermediate output. Desirably, data threshold 70 is set at slightly greater than ½ the peak value while timing threshold 72 is set at less than ½ the peak value. More preferably, data threshold 70 is set at around 5 dB below the peak value and timing threshold 72 is set at around 12 dB below the peak value in the preferred embodiment.

Data comparison circuit 58 detects correspondence between the instantaneous value of correlation signal 46 and data threshold 70. When correspondence is detected, a logical one may be recovered from the communicated signal. When correspondence is not detected at an appropriate time, a logical zero may be recovered from the communicated signal. Timing comparison circuit 60 detects correspondence between the instantaneous value of correlation signal 46 and timing threshold 72. When correspondence is detected, time may be measured to identify when the communicated signal arrives at receiver 14.

As discussed above, the noise level of correlation signal 46 increases, as shown at interval 50 in FIG. 2, when correlator 38 has not been preloaded with its PN sequence. Moreover, correlator 38 is not preloaded with its PN sequence when either the current or previous bit 18 is a logical zero. Thus, data threshold 70 is set at a higher level so that the chances of finding correspondence with noise are very low while the chances of finding correspondence with a legitimate spike 48 (see FIG. 2) are very high.

On the other hand, timing threshold 72 is set at a lower level so that correspondence will be found as soon as possible relative to the leading edge of the spike 48 that results from the second bit of bits 18 in message 16, as illustrated at point in time 74 in FIG. 2. The lower the timing threshold 72 the better because the influence of multipath is minimized. If multipath and direct path communicated signals tend to subtract from one another at receiver 14, then the combined correlation signal 46 may exhibit a more gradual slope than results from the direct path signal alone. A higher value timing threshold 72 would magnify the effects of the more gradual slope and provide a greater timing error. In addition, since the noise level of correlation signal 46 is lower during the second bit 18 of message 16 than it may be at other times in message 16, the low value for timing threshold 72 does not significantly risk false triggering on noise.

The event, data, and timing thresholds against which the instantaneous value of correlation signal 46 is compared are determined in response to peak values for correlation signal 46 rather than in response to a noise floor. This implementation is desirable because it provides greater immunity from noise. In particular, receiver 14 need not be configured to operate in accordance with worst case noise considerations. In addition, a more consistent and robust performance is obtained because the signal peaks and not the noise floor convey the information gathered by receiver 14.

An event clock signal 76, for which a timing diagram is shown in FIG. 2, drives enable inputs of comparison circuits 58 and 60. When event clock signal 76 is inactive, which is depicted as a low level in FIG. 2, comparison circuits 58 and 60 are prevented from finding correspondence. In the preferred embodiment, comparison circuits 58 and 60 have separate data and timing event clocks. As shown in FIG. 2, event clock signal 76 is inactive until after a previous spike 48 (not shown) from the first bit crosses the event threshold 68 in message 16. Thus, through event clock signal 76, comparison circuits 58 and 60 are prevented from finding correspondence during the first bit of message 16.

Figure 3:
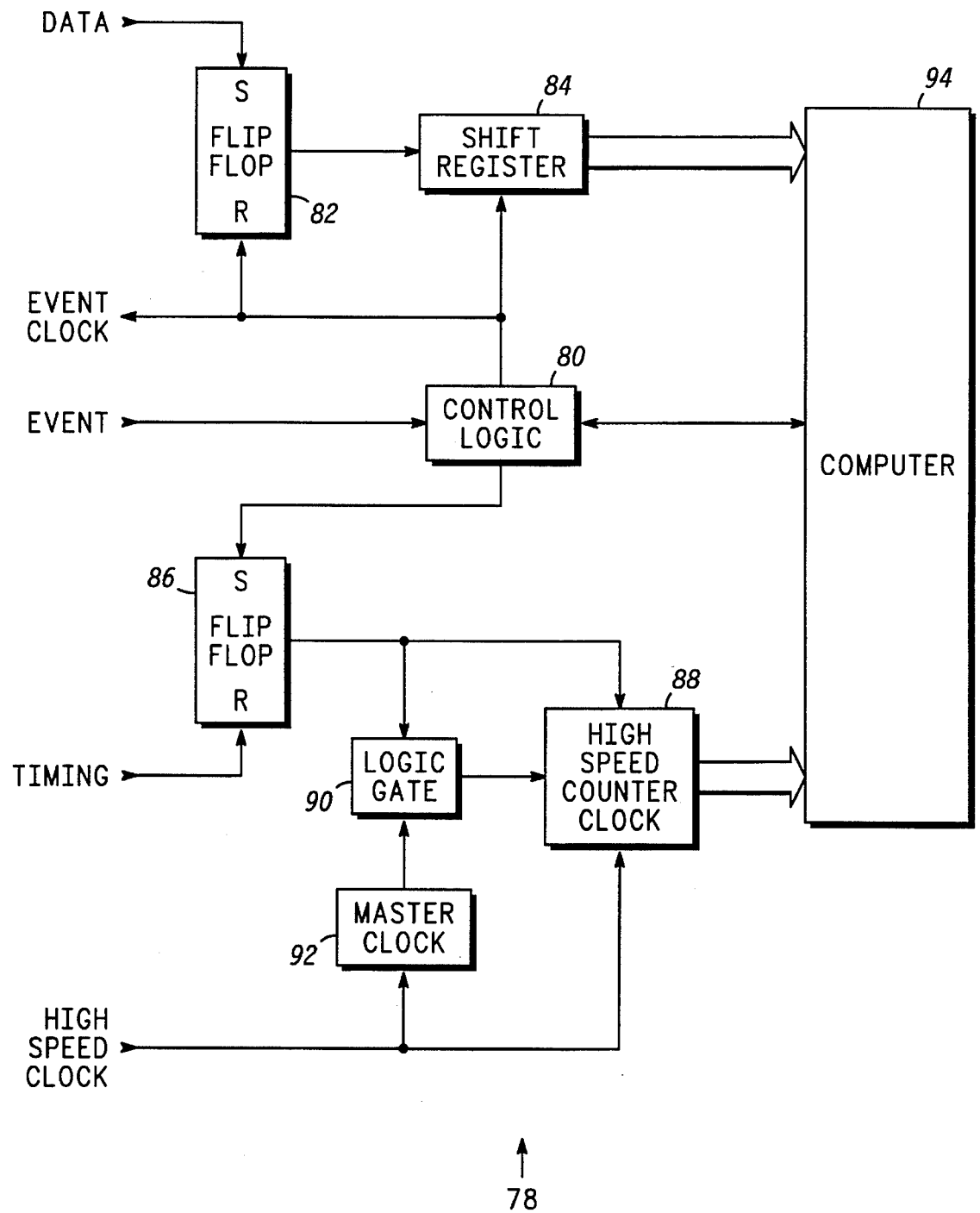
FIG. 3 shows a block diagram of a second portion of the system.

FIG. 3 shows a block diagram of a control section 78 of receiver 14. As shown in FIG. 3, a control logic block 80 of control section 78 generates event clock signal 76. Control logic block 80 uses conventional counter circuits (not shown) to generate event clock signal 76 in response to the activation of an event signal. The event signal activates when event comparison circuit 54 (see FIG. 1) detects the first bit of message 16 (not shown in FIG. 2). Generally speaking, event clock signal 76 activates prior to the end of each bit 18 in message 16, except for the first bit 18. Event clock signal 76 remains active into the beginning of the next bit 18. Thus, event clock signal 76 will be active if a spike 48 occurs due to the conveyance of a logical one bit in message 16.

Data comparison circuit 58 (see FIG. 1) generates a data signal that sets a flip flop 82 when correspondence with data threshold 70 (see FIG. 2) is found. Event clock signal 76 or its inverse drives a reset input of flip flop 82 so that flip flop 82 resets when event clock signal 76 is inactive. An output of flip flop 82 couples to a data input of a shift register 84, and the event clock signal 76 or its inverse also drives a clock input of shift register 84. Polarities are arranged so that shift register 84 clocks as event clock signal 76 goes inactive.

Flip flop 82 and shift register 84 recover data, other than the first bit of message 16, from the communicated signal. The flip flop 82 storage element is reset prior to the general timing interval where a spike 48 (see FIG. 2) might be present. Flip flop 82 is then set when a logical one data bit 18 causes a spike 48 (see FIG. 2). Flip flop 82 is not set and remains in its reset state when logical zero data bit 18 occurs. The state of flip flop 82 is shifted into the shift register 84 storage element after each bit 18 in message 16.

Timing comparison circuit 60 (see FIG. 1) generates a timing signal that resets a flip flop 86 when correspondence with data threshold 72 (see FIG. 2) is found. An output of flip flop 86 couples to an enable input of a high speed counter clock 88 and to a first input of a logic gate 90. Polarities are arranged so that counter clock 88 refrains from counting when flip flop 86 is reset, and flip flop 86 resets as soon as timing comparison circuit 60 (see FIG. 1) finds correspondence with timing threshold 72. Flip flop 86 remains reset throughout the remainder of message 16, and counter clock 88 is prevented from counting throughout the remainder of message 16.

A high speed clock signal, that in the preferred embodiment oscillates at almost 1 GHz, drives a master clock 92 and a clock input of high speed counter clock 88. Due to the high speed of the high speed clock signal, all or at least the faster stages of clocks 88 and 92 are implemented using an appropriate digital circuit technology, such as ECL. However, slower stages may be implemented using CMOS or other less expensive and complex digital circuit technologies. Master clock 92 and high speed counter clock 88 represent counter circuits. An output, such as a terminal count output, of clock 92 couples to a second input of logic gate 90. However, master clock 92 may serve as a master clock for multiple ones of receivers 14 and not just a single receiver 14 as shown in FIG. 3.

Master clock 92 and logic gate 90 provide a synchronizing function for counter clock 88. Logic functionality and signal polarities surrounding logic gate 90 are arranged so that counter clock 88 synchronizes with master clock 92 from time to time by being cleared, loaded with a predetermined value, or the like. More particularly, synchronization occurs when flip flop 86 has enabled counter clock 88 and master clock 92 reaches a terminal count.

Once initialized or synchronized with master clock 92, high speed counter clock 88 marks the passage of time in a manner that is consistent with master clock 92. Counter clock 88 counts oscillations of the high speed clock signal until disabled by flip flop 86. Counter clock 88 becomes disabled when correlation signal 46 (see FIG. 2) corresponds to timing threshold 72 (see FIG. 2). Counter clock 88 remains disabled throughout the remainder of message 16 so that the count achieved at the moment of being disabled does not change.

Control logic block 80 couples to a computer 94, as does shift register 84 and high speed counter clock 88. After the end of message 16, control logic 80 may inform computer 94 of the presence of message 16. Computer 94 may then read the data and timing from shift register 84 and counter clock 88, respectively. After the data and timing have been read, control logic 80 is free to activate an end-of-message signal 96, for which a timing diagram is shown in FIG. 2. End-of-message signal 96 drives a set input of flip flop 86. By setting flip flop 86 after data and timing have been read, counter clock 88 again becomes enabled to count. Then, after a predetermined period of time counter clock 88 becomes synchronized with master clock 92.

Computer 94 may use the data and timing information in any manner which is useful to system 10 (see FIG. 1). For example, computer 94 may subtract the duration of one bit 18 from the timing data measured by counter clock 88 to determine the time of arrival of the initial bit of message 16. Alternatively, computer 94 may simply compare different times of arrival measured from different receivers 14 in a conventional manner while performing a multilateration location process.

In summary, the present invention provides an improved system for identifying an arrival time of a communicated signal. A spread spectrum communicated signal is used to reduce the corrupting influences of multipath. These corrupting influences are further reduced by determining time of arrival in correspondence with a low timing threshold. The preferred embodiments of the present invention identify a point in time during-the transmission of a message when noise on a correlation signal will be reduced to lessen the chances of falsely indicating a time of arrival in response to noise. Furthermore, the thresholds against which the detection signal is compared are determined in response to peak values of the correlation signal rather than in response to a noise floor.

The present invention has been described above with reference to preferred embodiments. However, those skilled in the art will recognize that changes and modifications may be made in these preferred embodiments without departing from the scope of the present invention. For example, different signals could be used to enable data and timing comparison circuits with different timing. Moreover, different logic could be used to recover data and timing data from the data and timing comparison circuits. In addition, not all features described above need be included in a workable system that incorporates the present invention. For example, the variable event threshold discussed above may be replaced by a constant predetermined value with only slight degradation in performance. These and other changes and modifications which are obvious to those skilled in the art are intended to be included within the scope of the present invention.

What is claimed is:

1. An apparatus for identifying an arrival time of a communicated signal which conveys a message having a plurality of bits of data, said apparatus comprising:

a correlator for correlating said communicated signal with a PN sequence and to generate a correlation signal;

means, coupled to said correlator, for detecting the occurrence of a first bit of said message; and means, coupled to said detecting means and to said correlator, for determining when, after said first bit, said correlation signal corresponds to a threshold, wherein said determining means comprises a comparison circuit which is disabled during said first bit.

2. An apparatus as claimed in claim 1 wherein said determining means comprises means, coupled to said comparison circuit, for enabling said comparison circuit during said second bit, said second bit immediately following said first bit in said message.

3. An apparatus as claimed in claim 1 wherein:

said correlator is configured so that said correlation signal exhibits a peak value when said communicated signal correlates with said PN sequence; and said determining means is configured so that said threshold is responsive to said peak value.

4. An apparatus as claimed in claim 3 wherein said determining means is configured so that said threshold corresponds to a value less than approximately ½ said peak value.

5. An apparatus as claimed in claim 1 additionally comprising means, coupled to said correlator, for recovering data from said correlation signal and wherein:

said threshold represents a timing threshold; and said recovering means is configured so that said recovered data are responsive to a data threshold, said data threshold being greater than said timing threshold.

6. An apparatus as claimed in claim 1 wherein said correlator comprises a surface acoustic wave device configured to correlate when loaded with said PN sequence.

7. An apparatus as claimed in claim 1 wherein said threshold represents a timing threshold, and said detecting means comprises:

means for establishing an event threshold, said event threshold being responsive to a signal level for said correlation signal throughout a predetermined duration; and a comparison circuit configured to indicate an occurrence of said first bit when an instantaneous signal level of said correlation signal corresponds to said event threshold.

8. A method of identifying an arrival time of a communicated signal which conveys a message having a plurality of bits of data, said method comprising the steps of:

initiating a clock to mark the passage of time;

establishing a threshold;

receiving first and second bits of said signal:

correlating said first and second bits of said signal with a PN sequence, said correlating step producing a correlation signal; and stopping said clock following said first bit at a point in time when said correlation signal corresponds to said threshold, wherein said stopping step occurs during said second bit.

9. A method as claimed in claim 8 wherein said receiving step receives said second bit immediately following said first bit.

10. A method as claimed in claim 9 wherein said receiving step is configured to indicate that:

said signal conveyed said PN sequence during said first bit; and said signal conveyed said PN sequence during said second bit.

11. A method as claimed in claim 8 wherein:

said correlating step is configured so that said correlation signal exhibits a peak value when said communicated signal correlates with said PN sequence; and said step of establishing is configured so that said threshold is responsive to said peak value.

12. A method as claimed in claim 11 wherein said establishing step is configured so that said threshold corresponds to a value less than approximately ½ said peak value.

13. A method as claimed in claim 8 additionally comprising the step of recovering data from said correlation signal, wherein said threshold is a timing threshold and said recovering step comprises the steps of:

establishing a data threshold at a magnitude which is greater than said timing threshold; and recording in a storage element whether said correlation signal corresponds to said data threshold.

14. A method as claimed in claim 8 wherein said correlating step comprises the step of providing a surface acoustic wave device configured to correlate when loaded with said PN sequence.

15. A method as claimed in claim 8 wherein said threshold is a timing threshold, and said method additionally comprises the steps of:

establishing an event threshold, said event threshold being responsive to a signal level for said correlation signal throughout a predetermined duration; and detecting an occurrence of said first bit when an instantaneous signal level of said correlation signal corresponds to said event threshold.

16. A system for identifying an arrival time of a communicated signal, said system comprising:

a spread spectrum transmitter configured to transmit said communicated signal, said communicated signal conveying a message having a plurality of bits, said bits exhibiting first or second states wherein said first state is conveyed by encoding said communicated signal with a PN sequence and said second state is conveyed by an absence of PN sequence encoding in said communicated signal;

means for receiving said communicated signal:

a correlator coupled to said receiving means, said correlator being configured to correlate said communicated signal with said PN sequence and to generate a correlation signal;

means, coupled to said correlator, for detecting the occurrence of a first one of said bits of said message; and means, coupled to said detecting means and to said correlator, for determining when, after said first bit, said correlation signal corresponds to a threshold, wherein said determining means comprises:

a comparison circuit configured to compare said correlation signal with said threshold; and means, coupled to said comparison circuit, for disabling said comparison circuit during said first one of said bits and for enabling said comparison circuit during a second one of said bits, said second one of said bits occurring immediately after said first one of said bits.

17. A system as claimed in claim 16 wherein said transmitter is configured so that said first and second ones of said bits each exhibit said first state.

18. A system as claimed in claim 16 wherein:

said correlator is configured so that said correlation signal exhibits a peak value when said communicated signal correlates with said PN sequence; and said determining means is configured so that said threshold is responsive to said peak value.

19. A system as claimed in claim 16 wherein:

said threshold represents a timing threshold; and said system additionally comprises recovering means, coupled to said correlator, for recovering data from said correlation signal, said recovering means being configured so that said recovered data are responsive to a data threshold, said data threshold being greater than said timing threshold.

* * * * *

UNITED STATES PATENT AND TRADEMARK OFFICE
CERTIFICATE OF CORRECTION

PATENT NO. : 5,488,662
DATED : January 30, 1996
INVENTOR(S) : Thomas Michael Fox et al.

It is certified that error appears in the above-indentified patent and that said Letters Patent is hereby corrected as shown below:

In column 9, claim 8, line 6, after the word "and" begin a new paragraph.

Signed and Sealed this

Fourth Day of June, 1996

Attest:

BRUCE LEHMAN

*Attesting Officer*    *Commissioner of Patents and Trademarks*